June 14, 1932. G. COURVOISIER 1,863,298
ELECTRIC GENERATOR REGULATING SYSTEM
Filed July 23, 1930
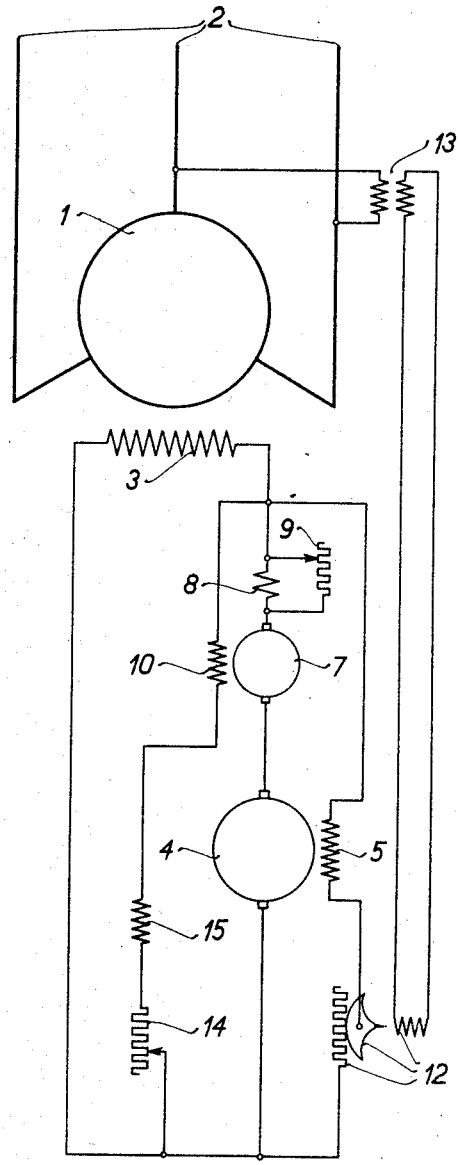
Inventor
Georges Courvoisier
By
Attorney Patented June 14, 1932

1,863,298

UNITED STATES PATENT OFFICE

GEORGES COURVOISIER, OF BADEN, SWITZERLAND, ASSIGNOR TO AKTIENGESELLSCHAFT BROWN, BOVERI & CIE., OF BADEN, SWITZERLAND, A JOINT-STOCK COMPANY OF SWITZERLAND

ELECTRIC GENERATOR REGULATING SYSTEM

Application filed July 23, 1930, Serial No. 469,951, and in Germany July 26, 1929.

This invention relates to improvements in exciting systems for generators and particularly to a system in which two exciting machines are available for selective operation to maintain the generator voltage at a constant value.

The voltage of an alternating current generator may be maintained constant and equalized independently of a load variation if the generator is excited by a direct current machine having series characteristics. Such arrangement is particularly favorable inasmuch as, with changes in the current in the exciter circuit, the variation in the induced voltage of the exciter corresponds exactly to variation in the ohmic voltage drop in the excitation circuit. Such excitation circuit has the ideal characteristic of damping winding. But, the current and voltage in an ohmic resistance being relatively linear, when a slightly saturated exciter is used which operates on the straight portion of the voltage curve, a relatively large machine must be used for which a stable regulation can hardly be expected.

It is, therefore, among the objects of the present invention to provide a regulating system for generators in which a main exciter is substantially sufficient to excite the generator to secure constant voltage thereof and an auxiliary exciter supplies additional excitation required for load variation.

Another object of the invention is to provide a regulating system for generators in which a regulator acting on a main exciter tends to keep the generator voltage constant and an auxiliary exciter operates only when additional excitation is required.

Another object of the invention is to provide a regulating system for generators in which a main and an auxiliary exciter are connected to the generator, the auxiliary exciter having a series and a shunt winding in opposition to each other to reduce the excitation thereof to zero when the generator voltage is constant.

Objects and advantages, other than those above set forth, will be apparent from the following description when read in connection with the accompanying drawing which schematically illustrates one embodiment of the present invention.

Referring more particularly to the drawing by characters of reference, reference numeral 1 designates the armature of an alternating current generator connected with a polyphase line 2 and having the field winding 3. The winding 3 is energized or excited by a main exciter comprising an armature 4 and a field winding 5 and an auxiliary exciter comprising an armature 7 having a series connected field winding 8 with a variable resistance 9 in parallel thereto and a shunt connected field winding 10. The main and auxiliary exciter are connected in series with the terminals of the generator winding 3.

The winding 5 of the main exciter is connected with a regulator 12 of a well-known type the voltage element of which is supplied from a transformer 13 connected with the line 2. The shunt winding 10 of the auxiliary exciter is connected with a reactance coil 15 and a variable main resistance 14 for the purpose of limiting and controlling the action of the shunt winding.

During operation, the main resistance 14 is so arranged that the ampere turns of both the series and the shunt windings 8 and 10 of the auxiliary exciter compensate. The regulator 12 then tends to maintain constant value in the excitation circuit. A load variation on the line 2 and, therefore, on the generator 1, 3, reacts by means of the voltage regulator on the exciting circuit in such a manner that an increase in the load causes an increase in the excitation current forcing the auxiliary exciter to supply an additional voltage to raise the excitation current to the value required by the load variation at the normal voltage. Such action prevents a further decrease of the excitation in the field 3 of the generator and the induced voltage disappears. A voltage increase in the excitation circuit results in a gradual increase of the excitation of the shunt winding 10 of the auxiliary exciter which however, due to the action of the reactance 15 builds the voltage up gradually.

When an increased load or other change on the line 2 causes a decrease in the voltage at the terminals of the generator, the regulator 12 operates to decrease the amount of the resistance in the exciter cicuit thereby producing an increase in the voltage of the main exciter. The gradual decrease of the voltage by the auxiliary exciter is thus equalized by the above regulating action. The reactance 15 and the resistance 14 may be adjusted in such manner that the action of both the main and auxiliary exciters come to rest at the same time.

It will thus be seen that the series winding 8 of the auxiliary exciter is so formed and arranged that the additional voltage produced by the auxiliary exciter corresponds to the necessary changes in the exciting voltage for the changed load conditions. The two windings of the auxiliary exciter are so connected as to act in opposition to each other and so adjusted, at constant load of the generator, that the resulting excitation of the auxiliary exciter is reduced to zero. The shunt winding 10 of the auxiliary exciter is in parallel with the field winding of the generator and the reactance connected in the circuit therewith so adjusts the time constant of the shunt winding that the auxiliary exciter becomes inactive only when the main exciter, due to the regulator action, has finished its movement and corresponds to the new load conditions.

Although but one embodiment of the present invention has been illustrated and described it will be apparent to those skilled in the art that various changes and modifications may be made therein without departing from the spirit of the invention or from the scope of the appended claims.

The invention claimed is:

1. In a system for regulating the excitation of a generator, an electric current generator, a main exciter for said generator, a regulator actuated responsive to the output voltages of the said generator operative to control the operation of said main exciter to maintain a substantially constant voltage delivery by said generator, a transformer connected with said generator and supplying the operating voltage to said regulator, an auxiliary exciter operable to supply a voltage in addition to that supplied by said main exciter when required by load changes on said generator, said auxiliary exciter having a series winding and a shunt winding in equalizing opposition during constant load on said generator.

2. In a system for regulating the excitation of a generator, an electric current generator, a main exciter for said generator, a regulator controlling the operation of said main exciter in dependence on variations of the voltage of said generator, a transformer connected with said generator and supplying the output voltage thereof to said regulator, and an auxiliary exciter operable to supply a voltage in addition to that supplied by said main exciter upon variations of load on said generator, said auxiliary exciter having a series winding and a shunt winding connected in opposition and operative to reduce the excitation of the auxiliary exciter to zero value during periods of constant load on the generator.

3. In a system for regulating the excitation of a generator, an electric current generator subject to output load variations, a main exciter for said generator, a regulator actuated responsive to the output voltages of the said generator operative to control the operation of said main exciter to maintain a substantially constant voltage delivery by said generator, a transformer connected with said generator and supplying the actuating voltage to said regulator, an auxiliary exciter operable to supply a voltage in addition to the voltage supplied by said main exciter during periods of output load variations of said generator, said auxiliary exciter having a series winding and a shunt winding, the said windings being connected in equalizing opposition during periods of constant load on said generator, and a reactance connected in circuit with the said shunt winding operative to so adjust the time constant of the circuit of the shunt winding as to reduce the excitation of the said auxiliary exciter to zero value upon regulation of the excitation of the said main exciter to value corresponding to changes in the output loads of said generator.

In testimony whereof I have hereunto subscribed my name this 14th day of July, A. D. 1930.

G. COURVOISIER.